(12) United States Patent
Kim et al.

(10) Patent No.: US 6,457,322 B1
(45) Date of Patent: Oct. 1, 2002

(54) FILTER HOUSING ASSEMBLY FOR REFRIGERATORS

(75) Inventors: Ill-Shin Kim; Yong-Chol Kwon; Si-Jae Kim, all of Changwon (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/589,280

(22) Filed: Jun. 8, 2000

(30) Foreign Application Priority Data

Jun. 8, 1999 (KR) .............................. 99-21213
Jul. 9, 1999 (KR) .............................. 99-27816

(51) Int. Cl.[7] .................. F25D 3/02; B01D 25/12
(52) U.S. Cl. ............... 62/318; 210/234; 210/424; 137/547
(58) Field of Search .............. 62/318, 319; 137/549, 137/547, 550; 251/149.6; 210/234, 435, 446; 220/592.16, 592.03; 206/545

(56) References Cited

U.S. PATENT DOCUMENTS 4,271,020 A * 6/1981 Van Meter .............. 210/424 X
4,379,053 A * 4/1983 Brane .......................... 210/234
5,107,896 A * 4/1992 Otto ........................ 137/625.29
5,192,436 A * 3/1993 Sasaki et al. ........... 210/424 X

* cited by examiner

Primary Examiner—Denise L. Esquivel
Assistant Examiner—Chen-Wen Jiang
(74) Attorney, Agent, or Firm—Birch, Stewart, Kolasch & Birch, LLP

(57) ABSTRACT

A filter housing assembly for refrigerators is disclosed. The assembly comprises an upper filter housing, a lower filter housing, a valve, and a passage control lever. The upper filter housing has an inlet, an outlet, an inflow passage and an outflow passage. The lower filter passage is detachably combined with the upper filter housing and holds a filter element for purifying water supplied through the inflow passage of the upper filter housing. The valve has a first passage hole, a second passage hole and a third passage hole so as to selectively connect the inlet to the outlet, and the inlet and the outlet respectively to the first inflow passage and the first outflow passage. The passage control lever is fixedly connected at its one end to the valve so as to rotate the valve for the selective connection of the valve.

7 Claims, 5 Drawing Sheets

FILTER HOUSING ASSEMBLY FOR REFRIGERATORS

BACKGROUND OF THE INVENTION

1. Field of the Invention

The present invention relates, in general, to a filter housing assembly for refrigerators and, more particularly, to a filter housing assembly for refrigerators, which is capable of preventing water from leaking during the replacement of filter elements and supplying water to the various portions of the refrigerator while its upper filter housing is separated from its lower filter housing.

2. Description of the Prior Art

As well known to those skilled in the art, some refrigerators have water purifying filters in their interiors so as to supply purified water to the outside of the refrigerators or produce ice using the purified water.

Referring to FIG. 1, the construction of a conventional filter housing assembly is disclosed.

As illustrated in the drawing, such a conventional filter housing assembly comprises an upper filter housing 10 and a lower filter housing 20. The upper filter housing 10 is combined with the lower filter housing 20 at its lower portion. The lower filter housing 20 is provided with a filter element (not shown) in its interior.

An inlet 10a through which water is supplied from the outside is formed in a side of the upper filter housing 10, and an outlet 11 through which water is discharged from the filter housing assembly is formed in the opposite side of the upper filter housing 10. A cylindrical connecting part 16 that is inserted into the upper portion of the lower filter housing 20 is formed in the central portion of the upper filter housing 10.

An inflow passage 10b that connects the inlet 10a of the upper filter housing 10 to the upper portion of the lower filter housing 20 is formed in the interior of the upper filter housing 10. A valve assembly (a reference numeral not assigned) is positioned on the upper portion of the inflow passage 10b and serves to cut off water supply during the replacement of filter elements by selectively opening and shutting the inflow passage 10b.

The valve assembly comprises a valve body 12, a spring 13 and an actuating member 14. The spring 13 is fitted into the recess 12a of the valve body 12 at its upper portion and into the hole 14b of the actuating member 14 at its lower portion. The bottom surface of the actuating member 14 is rounded off so as to be easily moved on the cam surface (will be described) of the top of the lower filter housing 20. The actuating member 14 is moved upward and downward by the rotation of the cam surface of the lower filter housing 20, and, consequently, the valve body 12 is moved upward and downward.

An engaging projection 18 is formed on the bottom of the upper filter housing 10 so as to engage the upper filter housing 10 with the lower filter housing 20.

The lower filter housing 20 serves to guide water, which enters the filter housing assembly through the upper filter housing 10, so as to pass through the filter element. A through hole 20a into which the cylindrical connecting part 16a is fitted is formed on the upper portion of the lower filter housing 20, and a plurality of engaging projections 22 are formed along the side surface of the lower filter housing 20. The engaging projections 22 are engaged with the engaging projection 18 of the upper filter housing 10 and allow the filtering case 20 to be combined with the filtering housing 10 securely.

The operation of the conventional filter housing assembly is disclosed hereinafter.

When the lower filter housing 20 is rotated while the connecting part 16 of the upper filter housing 10 is fitted into the through hole 20a of the lower filter housing 20, the cam surface 20b of the lower filter housing 20 lifts up the actuating member 14 of the valve assembly that is inserted into the inflow passage 10b. As a consequence, the valve body 12 that is connected to the actuating member 14 through the spring 13 is moved up. When the valve body 12 is moved up, the inflow passage 10b is opened and, consequently, water can flow into the lower filter housing 20 through the inflow passage 10b.

The water that is supplied to the upper filter housing 10 enters the lower filter housing 20 through one portion of the through hole 20a of the lower filter housing 20. The water is purified while passing through the filter element. Finally, the purified water is discharged through the other portion of the through hole 20a into the connecting part 16 of the upper filter housing 10. In such a case, the entering water and the purified water are not mixed because the connecting part 16 is deeply inserted into the through hole 20a. That is, the through hole 20a is partitioned by means of a portion 16a of the wall of the connecting part 16 and the filter element. The purified water discharged to the upper filter housing 10 is supplied to the ice-making unit of a freezer compartment (not shown), etc.

When the lower filter housing 20 is removed from the upper filter housing 10 by rotating the lower filter housing 20, the actuating member 14 is lowered down. As a consequence, the valve body 12 connected to the actuating member 14 through the spring 13 is lowered down, also. The lowered valve body 12 shuts the inflow passage 10b, and so cuts off the water supply.

The conventional filter housing assembly has the following defects.

That is, in accordance with the conventional filter housing assembly, upon the combination of the upper filter housing 10 and the lower filter housing 20, the inflow passage 10b of the upper filter housing 10 is opened. Therefore, while the actuating member 14 is moved upward by the cam surface 20b of the lower filter housing 20 before the upper filter housing 10 is combined with the lower filter housing 20 completely, the valve body 12 is moved up, and so the inflow passage 10b is opened. As a result, water that enters the filter housing assembly through the opened inflow passage 10b leaks through the small gap between the upper filter housing 10 and the lower filter housing 20. At this time, the water is spouted from the gap and leaks at a high pressure because the gap is small.

In addition, since the inflow passage 10b of the upper filter housing 10 is shut while the upper filter housing 10 is separated from the lower filter housing 20, water supply to the various portions of the refrigerator is completely cut off before the upper filter housing 10 is combined with the lower filter housing 20 again.

SUMMARY OF THE INVENTION

Accordingly, the present invention has been made keeping in mind the above problems occurring in the prior art, and an object of the present invention is to provide a filter housing assembly for refrigerators, which is capable of shutting the inflow passage of the filter housing assembly completely, thereby preventing water from leaking during the replacement of filter elements.

Another object of the present invention is to provide a filter housing assembly for refrigerators, which is capable of supplying water to the various portions of the refrigerator while its upper filter housing is separated from its lower filter housing.

In order to accomplish the above object, the present invention provides a filter housing assembly for refrigerators, comprising an upper filter housing having an inlet, an outlet, an inflow passage and an outflow passage; a lower filter housing being detachably combined with the upper filter housing and holding a filter element for purifying water supplied through the inflow passage of the upper filter housing; a valve having a first passage hole, a second passage hole and a third passage hole so as to selectively connect the inlet to the outlet, and the inlet and the outlet respectively to the first inflow passage and the first outflow passage; and a passage control lever fixedly connected at its one end to the valve so as to rotate the valve for the selective connection of the valve.

Preferably, the valve may comprise an upper valve member and a lower valve member in the form of circular plates, the second passage hole and the third passage hole being vertically and oppositely formed through both sides of the lower valve member, the first passage hole being horizontally formed through the upper valve member in a direction that passes a straight line, which connects the second passage hole with a third passage hole, at a right angle, and the passage control lever may be connected at its one end to a plane surface of the valve.

Preferably, the assembly may further comprise a valve-rotation preventing member for preventing the valve from being rotated while the upper filter housing is separated from the lower filter housing, the valve-rotation preventing member being positioned in a side of the upper filter housing.

Preferably, the assembly further may comprise a locking recess that is formed on a side of the upper surface of the lower valve member, the valve-rotation preventing member being inserted into the locking recess while the upper filter housing is separated from the lower filter housing and being removed from the locking recess while the upper filter housing is combined with the lower filter housing.

Preferably, the assembly may further comprise a filter-rotation preventing member for preventing the lower filter assembly from being rotated while water is supplied to the lower filter housing through the valve, the filter-rotation preventing member being at its upper end in contact with an inclined cam surface that is formed on a side of the bottom surface of the lower valve member.

Preferably, a filter-rotation preventing recess may be formed on the lower filter housing for receiving the lower end portion of the filter-rotation preventing member, the filter-rotation preventing member may comprise a body, a spring and a support, the body being in contact with the inclined cam surface and moved upward and downward by rotation of the inclined cam surface, the support being formed on the upper portion of the body and holding the spring, the spring elastically supporting the body and the support upward, and a supporting step is formed on the upper filter housing for supporting a lower end of the spring.

Preferably, the valve may comprise a cylindrical body, the first passage hole vertically formed in a central portion of the cylindrical body, and the second and third passage holes vertically and oppositely formed on both sides of the cylindrical body, and the passage control lever is connected at its one end to a plane surface of the valve.

Preferably, a stop portion is formed on an end of the passage control lever, and a lever-rotation preventing projection is formed on the outer surface of the lower filter housing for allowing a proper passage change to be performed and preventing the lower filter housing from being rotated by stopping the stop portion.

Preferably, the method may further comprise a lever locking plate for preventing the passage control lever from being rotated while the upper filter housing is separated from the lower filter housing, the lever locking plate surrounding the passage control lever.

Preferably, a locking neck may be formed on the passage control lever by cutting off a certain width of upper and lower portions out of the passage control lever at a predetermined position, and a locking hole having locking notch may be formed through the lever locking plate so that the locking neck is inserted into the locking notch portion of the locking hole in a case where the passage control lever is rotated at a predetermined angle.

Preferably, the method may further comprise a support projection for lifting up the lever locking plate when the upper filter housing is combined with the lower filter housing, the support projection being formed on the outer surface of the lower filter housing.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
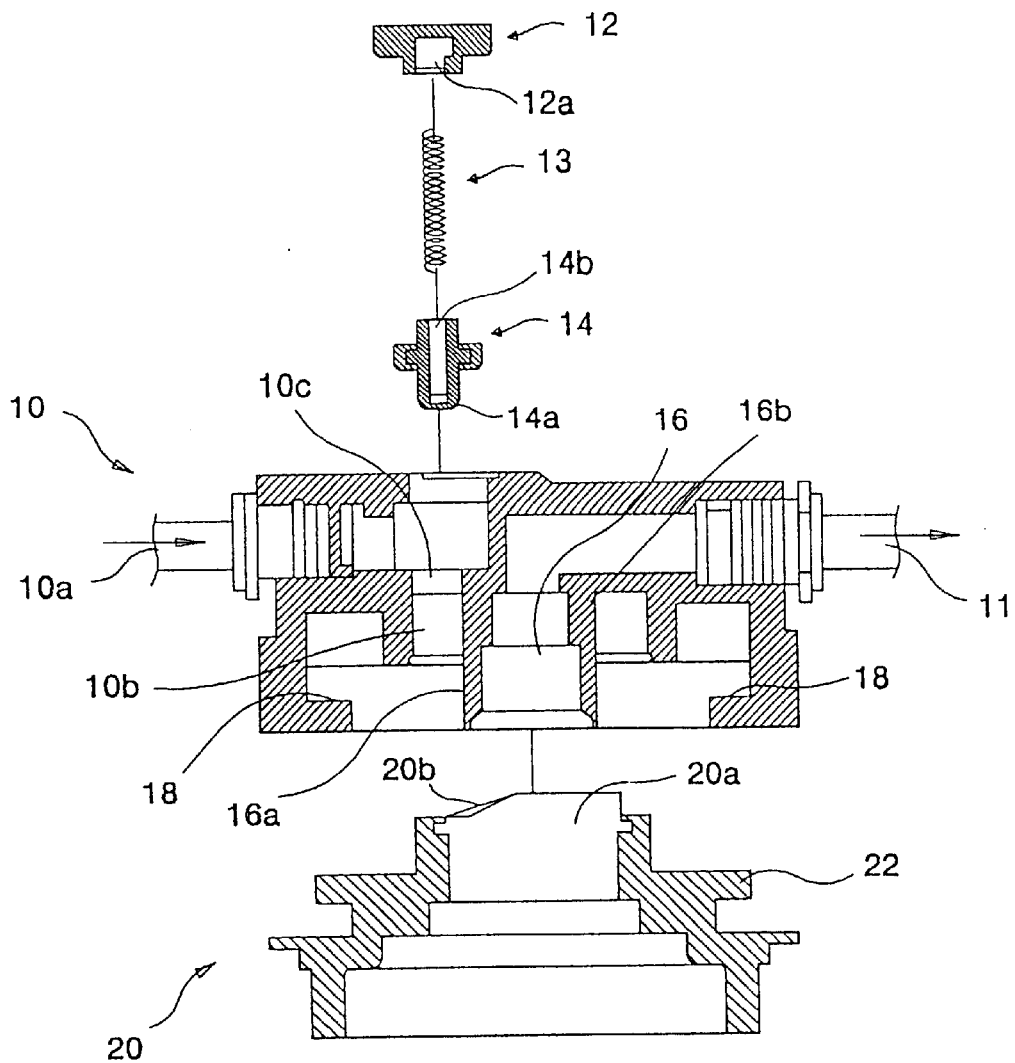
FIG. 1 is a sectional view showing a conventional filter housing assembly for refrigerators.

Reference now should be made to the drawings, in which the same reference numerals are used throughout the different drawings to designate the same or similar components.

Figure 2:
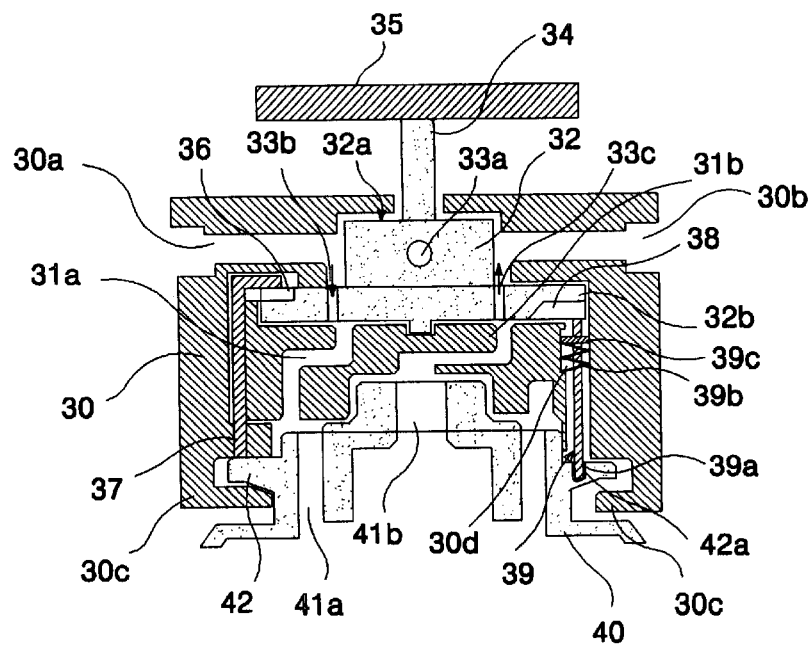
FIG. 2 is a sectional view showing a filter housing assembly for refrigerators in accordance with a first embodiment of the present invention.

FIG. 2 is a sectional view showing a filter housing assembly for refrigerators in accordance with a first embodiment of the present invention.

As illustrated in the drawing, a filter housing assembly comprises an upper filter housing 30 and a lower filter housing 40.

An inlet 30a through which water is supplied from the outside is formed in a side of the upper filter housing 30, and an outlet 30b through which water is supplied to various portions of a refrigerator (not shown) is formed in the opposite side of the upper filter housing 30. A first inflow passage 31a through which water is supplied to the lower filter housing 40 and a first outflow passage 31b through which water is discharged from the lower filter housing 40 are formed in the interior of the upper filter housing 30.

A valve assembly 32 is positioned in the center portion of the upper filter housing 30 in such a fashion that the valve assembly 32 is capable of selectively connecting the inlet 30a to the outlet 30b, and the inlet 30a and the outlet 30b respectively to the first inflow passage 31a and the first outflow passage 31b.

The valve assembly 32 consists of an upper valve member 32a and a lower valve member 32b in the form of circular plates. A first passage hole 33a is horizontally formed through the upper valve member 32a in a direction that passes a straight line, which connects a second passage hole 33b (will be described) with a third passage hole 33c (will be described), at a right angle. The first passage hole 33a serves to connect the inlet 30a to the outlet 30b while the upper filter housing 30 is separated from the lower filter housing 40.

A connecting member 34 is connected to the upper valve member 32a at its lower end, passes through the upper filter housing 30 and is connected to a passage control lever 35 at its lower end. The passage control lever 35 serves to change a passage to another passage by rotating the valve assembly 32.

The second passage hole 33b is vertically formed through a side of the lower valve member 32b to connect the inlet 30a to a second inflow passage (will be described) of the lower filter housing 40, and the third passage hole 33c is vertically formed through the opposite side of the lower valve member 32b to connect the outlet 30b to a second outflow passage (will be described) of the lower filter housing 40. A locking recess 36 into which a valve-rotation preventing member 37 (will be described) is inserted is formed on a side of the upper surface of the lower valve member 32b. When the valve-rotation preventing member 37 is inserted into the locking recess 36, the rotation of the valve assembly 32 is prevented and, consequently, water leakage due to a passage change to the lower filter housing 40 is prevented while the upper filter housing 30 is separated from the lower filter housing 40.

The valve-rotation preventing member 37 is perpendicularly bent. The valve-rotation preventing member 37 is movably positioned in the interior of the upper filter housing 30 in such a fashion that the valve-rotation preventing member 37 is moved upward when the valve-rotation preventing member 37 is supported by the lower filter housing 40 at its lower end, and the valve-rotation preventing member 37 is moved downward and inserted into the locking recess 36 due to its own weight when the valve-rotation preventing member 37 is not supported by the lower filter housing 40 at its lower end.

An inclined cam surface 38 is formed on the lower surface of a side of the lower valve member 32b. A filter-rotation preventing member (39, will be described) is movably positioned beneath the inclined cam surface 38. As the inclined cam surface 38 is rotated by the rotation of the valve assembly 32, the filter-rotation preventing member 39 is moved upward and downward by the inclined cam surface 38.

The filter-rotation preventing member 39 comprises a body 39a, a spring 39b surrounding the body 39a and a support 39c formed on the upper portion of the body 39a.

The body 39a is in contact with the inclined cam surface 38 and moved upward and downward by the rotation of the inclined cam surface 38. The support 39c that is formed on the upper portion of the body 39a serves to hold the spring 39b. The spring 39b elastically supports the body 39a and the support 39c upward. A supporting step 30d is formed on the upper filter housing 30 for supporting the lower end of the spring 39b.

An engaging projection 30c is formed along the lower portion of the upper filter housing 30. The engaging projection 30c is engaged with the engaging projection 42 (will be described) of the lower filter housing 40.

The second inflow passage 41a that water supplied to the upper filter housing 30 enters is formed through a side of the lower filter housing 40, and the second outflow passage 41b through which purified water is discharged to the upper filter housing 30 is formed through the center portion of the lower filter housing 40.

The plurality of engaging projections 42 are formed along the side surface of the lower filter housing 40. Since the lower surfaces of the engaging projections 42 are inclined, the engaging projections 42 are guided by the engaging projections 42 of the upper filter housing 30 and easily engaged with the engaging projections 42 of the upper filter housing 30.

A filter-rotation preventing recess 42a is formed on the upper surface of the engaging projection 42 of the lower filter housing 40. The filter-rotation preventing recess 42a receives the lower end portion of the filter-rotation preventing member 39. Therefore, the lower filter housing 40 cannot be rotated while the filter-rotation prevention member 39 is inserted into the filter-rotation preventing member 39.

Figure 3A:
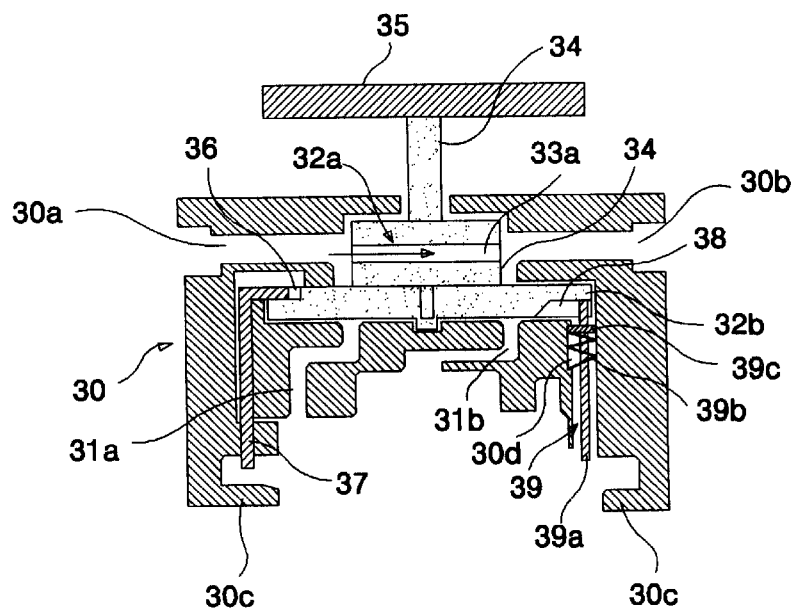
FIGS. 3a to 3c are sectional views showing a process in which the upper filter housing of the filter housing assembly is combined with the lower filter housing of the filter housing assembly.
Figure 3B:
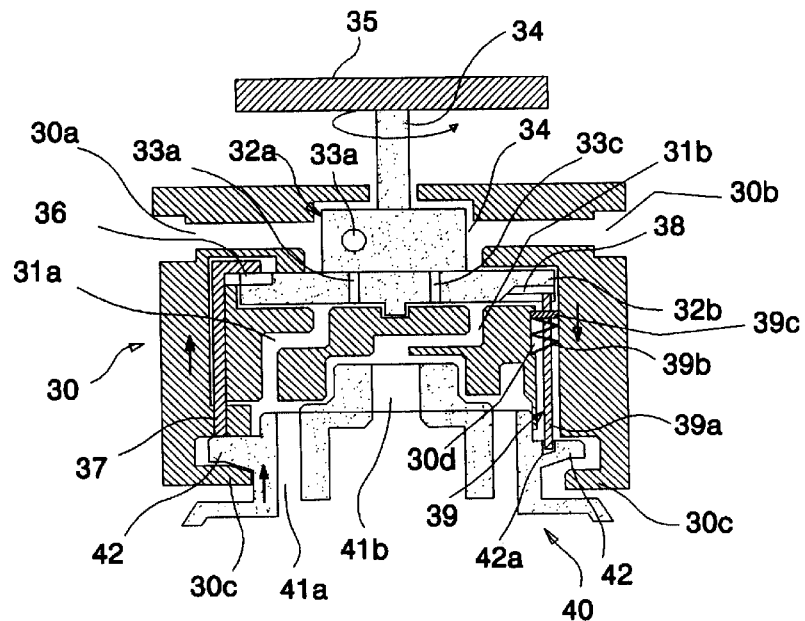
Figure 3C:
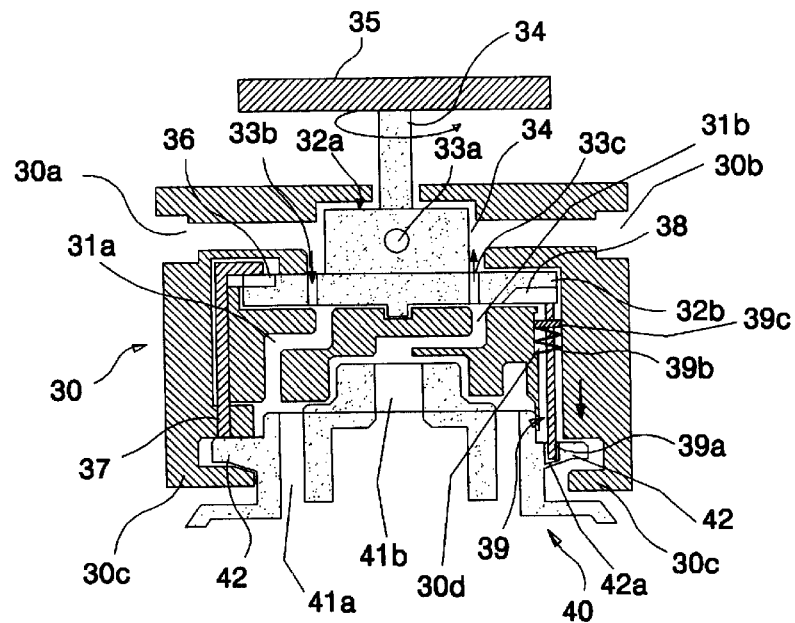

With reference to FIGS. 3a to 3c, the operation of the filter housing assembly in accordance with the first embodiment of the present invention is described hereinafter.

FIG. 3a is a sectional view showing the filter housing assembly with the lower filter housing 40 separated from the upper filter housing 30. In such a state, the first passage hole 33a of the upper valve member 32a is positioned to connect the inlet 30a of the upper filter housing 30 to the outlet 30b of the upper filter housing 30, as illustrated in FIG. 3a. The second passage hole 33b and the third passage hole 33c of the lower valve member 32b that pass the first passage hole 33a of the upper valve member 32a at a right angle are not connected to the first inflow passage 31a and the first outflow passage 31b, respectively. Therefore, water supply from the upper filter housing 30 to the lower filter housing 40 is cut off.

At this time, since the horizontal upper portion of the valve-rotation preventing member 37 is engaged with the locking recess 36, the rotation of the valve assembly 32 is prevented. Therefore, while the upper filter housing 30 is separated from the lower filter housing 40, a passage change due to the rotation of the valve assembly 32 is prevented and, consequently, the occurrence of leakage is prevented.

The upper end of the filter-rotation preventing member 39 is in contact with the inclined cam surface 38 of the lower valve member 32b. While the upper filter housing 30 is separated from the lower filter housing 40, the upper end of the filter-rotation preventing member 39 is in contact with the highest position of the inclined cam surface 38.

FIG. 3b is a sectional view in which the upper filter housing 30 is combined with the lower filter housing 40 and the valve assembly 32 is rotated by the rotation of the passage control lever 35 that is connected to the valve assembly 32 by the connecting member 34.

The lower filter housing 40 is rotated while the upper portion of the lower filter housing 40 is inserted to the lower portion of the upper filter housing 30. In such a case, the engaging projections 42 of the lower filter housing 40 are completely engaged with the engaging projection 30c of the upper filter housing 30. At this time, since the lower surface of the engaging projections 42 of the lower filter housing 40 is inclined, the engaging projections 42 of the lower filter housing 40 are easily engaged with the engaging projection 30c of the upper filter housing 30.

When the upper filter housing 30 is combined with the lower filter housing 40, the valve-rotation preventing member 37 is moved upward by the upper surface of an engaging projection 42 of the lower filter housing 40. In this case, the upper portion of the valve-rotation preventing member 37 is removed from the locking recess 36. As a result, the valve assembly 32 that was secured by the valve-rotation preventing member 37 becomes rotatable.

In such a state, when the passage control lever 35 that is connected to the valve assembly 32 by the connecting member 34 is rotated, the upper and lower valve members 32a and 32b are rotated.

When the valve assembly 32 is rotated, the position of the first passage hole 33a of the upper valve member 32a that connected the inlet 30a to the outlet 30b is changed. Therefore, the passage between the inlet 30a and the outlet 30b is cut off.

When the lower valve member 32b is rotated, the body 39a of the filter-rotation preventing member 39 in contact with the inclined cam surface 38 is moved downward by the rotation of the inclined cam surface 38.

When the body 39a of the filter-rotation preventing member 39 is moved down, the lower end portion of the body 39a is inserted into the filter-rotation preventing recess 42a of the engaging projection 42 of the lower filter housing 40 and prevents the lower filter housing 40 from being rotated. Consequently, after the upper filter housing 30 is combined with the lower filter housing 40 and the passage between the inlet 30a and the outlet 30b is cut off by the rotation of the valve assembly 32, the undesirable separation of the lower filter housing 40 from the upper filter housing 30 is prevented and, therefore, water leakage due to the separation of the filter housing assembly is prevented.

FIG. 3c is a sectional view in which the rotation of the valve assembly 32 is completed while the upper filter housing 30 is combined with the lower filter housing 40. As illustrated, the valve assembly 32 is rotated at a right angle by means of the rotation of the passage control lever 35 so that water can be supplied from the upper filter housing 30 to the lower filter housing 40.

In this case, the passage between the inlet 30a and the outlet 30b is cut off, and the second and third passage holes 33b and 33c that pass the first passage hole 33a at a right angle are respectively connected to the first inflow passage 31a and the first outflow passage 31b of the upper filter housing 30.

In the meantime, the first inflow passage 31a of the upper filter housing 30 is connected to the second inflow passage 41a of the lower filter housing 40, while the first outflow passage 31b of the upper filter housing 30 is connected to the second outflow passage 41b of the lower filter housing 40.

Therefore, water that has been supplied to the inlet 30a of the upper filter housing 30 is supplied to the second inflow passage 41a of the lower filter housing 40 through the second passage hole 33b of the lower valve member 32b and the first inflow passage 31a of the upper filter housing 30. The water that has been supplied to the second inflow passage 41a of the lower filter housing 40 is purified in the filter element and the purified water is supplied to the various portion of the refrigerator through the second outflow passage 41b of the lower filter housing 40, the first outflow passage 31b of the upper filter housing 30, the third passage hole 33c of the lower valve member 32b and the outlet 30b of the upper filter housing 30.

As described above, since the valve-rotation preventing member 37 is moved upward and the upper portion of the valve-rotation preventing member 37 is removed from the locking recess 36 of the lower valve member 32b while the upper filter housing 30 is combined with the lower filter housing 40, the valve assembly 32 can be rotated. As a result, since a passage change is possible after the upper filter housing 30 is combined with the lower filter housing 40, there is prevented water leakage due to a passage change in a state where the upper filter housing 30 is separated from the lower filter housing 40.

On the other hand, the separation procedure of the filter housing assembly for the replacement of filter elements is performed in reverse order. That is, the separation procedure starts from FIG. 3c, passes through FIG. 3b and ends in FIG. 3a.

In FIG. 3c, when the passage control lever 35 is rotated at a right angle, the valve assembly 32 that is connected to the passage control lever 35 by the connecting member 34 is rotated as shown in FIG. 3a. In such a case, the first passage hole 33a of the upper valve member 32a connects the inlet 30a to the outlet 30b, so that water supplied through the inlet 30a of the upper filter housing 30 passes through the first passage hole 33a of the upper valve member 32a and is supplied to the outlet 30b of the upper filter housing 30. Therefore, in accordance with the filter housing assembly of the present invention, water can be supplied to the various portions of the refrigerator even while the upper filter housing 30 is separated from the lower filter housing 40. Furthermore, when the purification of water is not needed because the quality of water is sufficient for drinking, water is directly supplied to the various portions of the refrigerator by changing a water passage in this fashion without passing through the filer element.

When the valve assembly 32 is rotated as shown in FIG. 3a, the filter-rotation preventing member 39 that is in contact with the inclined cam surface 38 of the lower valve member 32b is moved upward by the rotation of the inclined cam surface 38 of the lower valve member 32b and the restoring force of the spring 39b. As a result, the lower end portion of the body 39a of the filter-rotation preventing member 39 is completely removed from the filter-rotation preventing recess 42a of the engaging projection 42 of the lower filter housing 40. If the body 39a of the filter-rotation preventing member 39 is completely removed from the filter-rotation preventing recess 42a of the lower filter housing 40, the lower filter housing 40 can be rotated. Therefore, if the lower filter housing 40 is rotated, the engaging projection 42 of the lower filter housing 40 is easily separated from the engaging projection 30c of the upper filter housing 30.

When the lower filter housing 40 is separated from the upper filter housing 30, the valve-rotation preventing member 37 that was supported by the upper surface of the engaging projection 42 of the lower filter housing 40 is moved downward by its own weight (refer to FIG. 3a). At this time, the upper portion of the valve-rotation preventing member 37 is inserted into the locking recess 36 of the upper surface of the lower valve member 32b, so that the valve-rotation preventing member 37 prevents the valve assembly 32 from being rotated. As a result, since the valve assembly 32 cannot be rotated while the upper filter housing 30 is separated from the lower filter housing 40, water leakage due to a passage change can be prevented.

Hereinafter, there is described a filter housing assembly in accordance with a second embodiment of the present invention.

Figure 4:
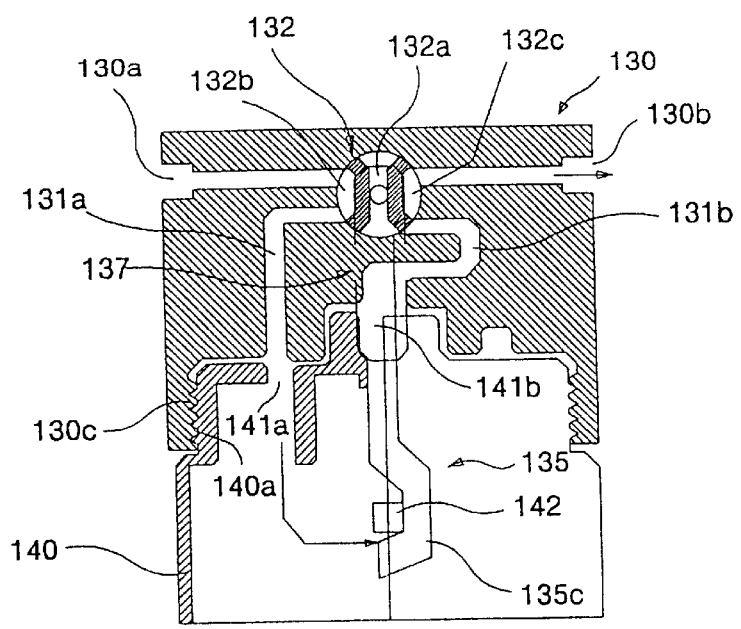
FIG. 4 is a sectional view showing a filter housing assembly in accordance with a second embodiment of the present invention.

FIG. 4 is a sectional view showing the filter housing assembly in accordance with the second embodiment of the present invention. As illustrated in the drawing, the filter housing assembly comprises an upper filter housing 130 and a lower filter housing 140. The upper filter housing 130 is combined with the lower filter housing 140. The lower filter housing 140 is provided with a filter element (not shown) in its interior.

An inlet 130a through water is supplied from the outside is formed in a side of the upper filter housing 130, and an outlet 130b through which water is discharged from the filter housing assembly is formed in the opposite side of the upper filter housing 130. A first inflow passage 131a through which water is supplied to the lower filter housing 140 and a first outflow passage 131b through which water is discharged from the lower filter housing 140 are formed in the interior of the upper filter housing 130.

A valve assembly 132 is positioned in the center portion of the upper filter housing 130 in such a fashion that the valve assembly 132 is capable of selectively connecting the inlet 130a to the outlet 130b and the inlet 130a and the outlet 130b respectively to the first inflow passage 131a and the first outflow passage 131b.

The valve 132 is in the form of a cylinder. A first passage hole 132a is vertically formed in the central portion of a cylindrical body (a reference numeral not assigned), and a second passage depression 132a and a third passage depression 132b are vertically and oppositely formed in both sides of the cylindrical body.

The valve 132 serves to change water passages while being rotated, by means of the first passage hole 132a, the second passage depression 132b and the third passage depression 132c. That is, by the action of the valve 132, water supplied through the inlet 130a of the upper filter housing 130 is allowed to flow into the lower filter housing 140 through the second passage depression 132b when the upper filter housing 130 is combined with the lower filter housing 140, while the inlet 130a of the upper filter housing 130 is allowed to be connected to the outlet 130b of the upper filter housing 130 by the first passage hole 132a when the lower filter housing 140 is separated from the upper filter housing 130.

Figure 5:
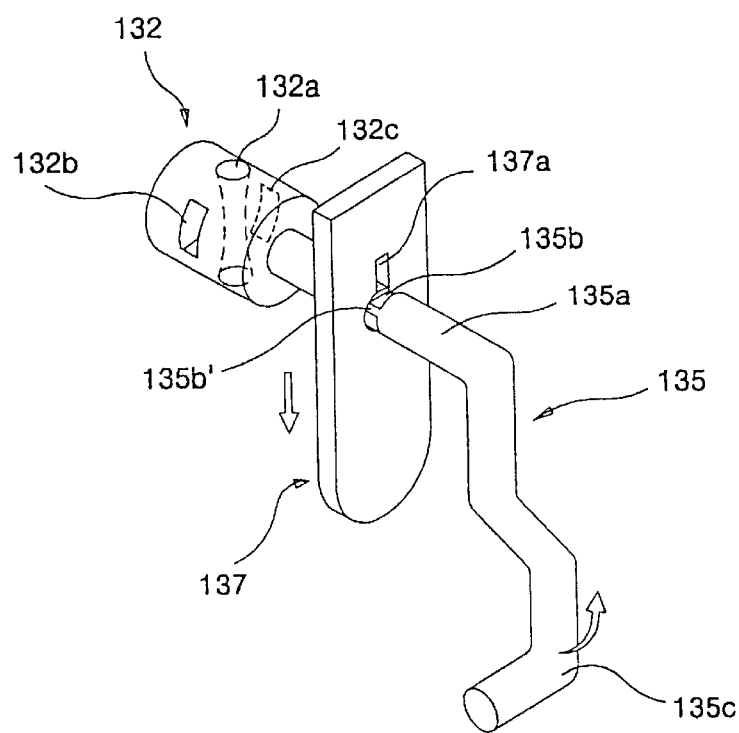
FIG. 5 is a perspective view showing the valve, the passage control lever and the lever locking member of the filter housing assembly of FIG. 3 in detail.

A passage control lever 135 in the form of a rod is fixedly connected to a plane of the valve 132 at its one end. The passage control lever 135 is moved together with the valve 132 and serves to rotate the valve 132. As illustrated in FIG. 5, the passage control lever 135 is bent, and comprises an extended portion 135a and a stop portion 135c. The extended portion 135a is connected to the valve 132 at its one end, and the stop portion 135c serves to fix the position of the valve 132.

An internally threaded portion 130c is formed on the inner surface of the lower portion of the upper filter member 130. Of course, it may be possible to form the engaging projection 30c of the first embodiment instead of the internally threaded portion 130c.

Referring to FIG. 4, a second inflow passage 141a through which water supplied to the upper filter housing 130 flows is formed through a side of the lower filter housing 140, while a second outflow passage 141b through which purified water is discharged is formed through the central portion of the lower filter housing 140.

A lever-rotation preventing projection 142 is formed on the outer surface of the upper filter housing 140. When the passage control lever 135 is rotated for a passage change while the upper filter housing 130 is combined with the lower filter housing 140, the lever-rotation preventing projection 142 serves to stop the passage control lever 135 from being rotated after the passage control lever 135 performs a proper passage change. Additionally, when the inlet 130a and the outlet 130b are respectively connected to the first inflow passage 131a and the first outflow passage 131b, the lever-rotation preventing projection 142 serves to stop the stop portion 135c of the passage control lever 135 and prevent the lower filter housing 140 from being rotated, thereby preventing water leakage due to the undesirable rotation of the lower filter housing 140.

FIG. 5 is a perspective view showing the valve 132, the passage control lever 135 and a lever locking member 137 in detail.

A locking neck 135b is formed on the extended portion 135a of the passage control lever 135 at a predetermined position. The locking neck 135b is formed by cutting the extended portion 135a of the passage control lever 135 in the form of a plate. When the passage control lever 135 is rotated at a predetermined angle, the locking neck 135b is inserted into the locking notch portion of the locking hole 137a of a lever locking plate 137 (will be described). Since the locking neck 135b is formed by cutting off upper and lower sub-portions out of the extended portion 135a of the passage control lever 135, the side surfaces of the locking neck 135b are curved. Therefore, the locking neck 135b can be rotated within the circular portion of the locking hole 137b.

Figure 6A:
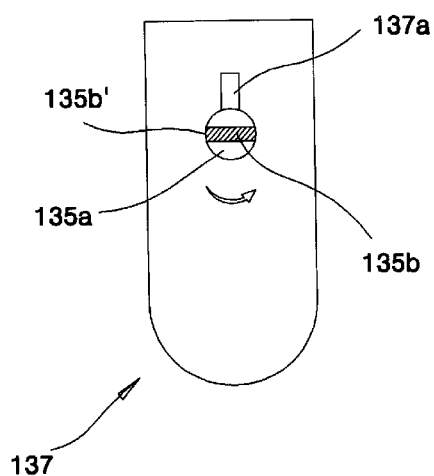
FIGS. 6a and 6b are partial sectional views showing the operation of the locking neck and the lever-locking plate.
Figure 6B:
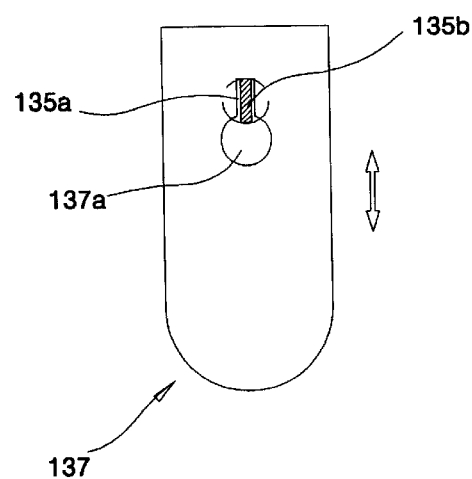
Figure 7:
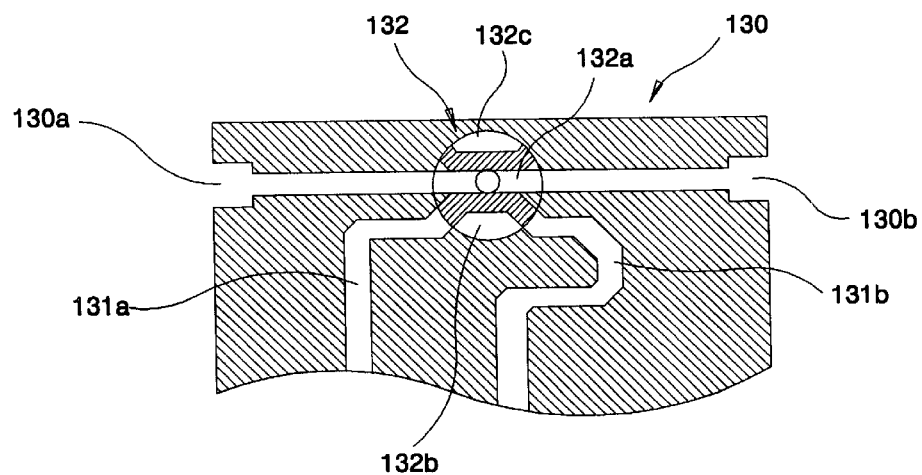
FIG. 7 is an enlarged sectional view of the filter housing assembly of the second embodiment showing a state where a water passage is formed between an inlet and an outlet.

FIGS. 6a and 6b are partial sectional views showing the operation of the locking neck 135b and the lever-locking plate 137. With reference to the drawings, the operation of the locking neck 135b and the lever locking plate 137 is described hereinafter.

The locking hole 137a is formed through the upper portion of the lever locking plate 137. The locking hole 137a comprises the locking notch portion and the circular portion. Therefore, while the locking neck 135b of the extended portion 135a is positioned horizontally, the locking neck 135b of the extended portion 135a can be rotated within the circular portion of the locking hole 137a (refer to FIG. 6a). When the locking neck 135b of the extended portion 135a is rotated and positioned vertically, the lever locking plate 137 is moved downward by means of its own weight and, consequently, the locking neck 135b of the extended portion 135a is inserted into the locking notch of the locking hole 137a (refer to FIG. 6b). In this case, the passage control lever 135 cannot be rotated. As a result, the lever locking plate 137 locks the passage control lever 135 and prevents the passage control lever 135 from being rotated, thereby preventing an undesirable passage change.

An externally threaded portion 140a is formed on the outer surface of the upper portion of the lower filter housing 140, and is engaged with the internally threaded portion 130c of the upper filter housing 130 so as to combine the upper filter housing 130 with the lower filter housing 140. Of course, it may be possible to form the engaging projection 42 of the first embodiment instead of the externally threaded portion 140a.

With reference to FIGS. 4 to 7, the operation of the filter housing assembly in accordance with the second embodiment of the present invention is described hereinafter.

FIG. 4 is a sectional view of the filter housing assembly of the second embodiment in which the inlet 131a and the outlet 130b are respectively connected to the first inflow passage 131a and the first outflow passage 131b. As shown in FIG. 4, the passage control lever 135 is in contact with the lever-rotation preventing projection 142 of the lower filter housing 140. In this state, when the passage control lever 135 is rotated counterclockwise, the valve 132 connected to the passage control lever 135 is rotated counterclockwise, also.

At this time, the first passage hole 132a is connected to the inlet 130a and the outlet 130b, while the second passage depression 132b and the third passage depression 132c are respectively moved downward and upward. Therefore, one passage through which water is supplied to the lower filter housing 140 is changed into the other passage that connects the inlet 130a to the outlet 130b.

In this case, since the lower filter housing 40 is separated from the upper filter housing 30 and an old filter element is replaced for a new one while the water supply to the lower filter housing 40 is completely cut off, water leakage can be prevented. Even when the purification of water is not needed or is difficult to perform, water can be supplied to the various portions of the refrigerator.

On the other hand, when the passage control lever 135 is rotated, the locking neck 135b of the extended portion 135a is positioned vertically. In such a case, the lever locking plate 137 is moved downward by means of its own weight and, consequently, the locking neck 135b of the extended portion 135a is inserted into the locking notch of the locking hole 137a (refer to FIG. 6b). Therefore, the passage control lever 135 is fixed and cannot be rotated. As a result, water leakage is prevented due to the undesirable rotation of the passage control lever 135 and, consequently, the occurrence of a passage change.

In this state, after the lower filter housing 130 is combined with the upper filter housing 140, the lever locking member 137 is moved upward and the passage control lever 135 is rotated clockwise so as to perform a passage change. As the passage control lever 135 is rotated clockwise, the valve 132 is rotated clockwise and, consequently, the passage change is performed. In this case, the first passage hole 132a, the second passage depression 132b and the third passage depression 132c of the valve 132 are positioned vertically, so that the water passage that connects the inlet 130a to the outlet 130b is eliminated and the passages that connect the inlet 130a and the outlet 130b respectively with the first inflow passage 131a and the first outflow passage 131b are formed.

In such a case, the lever locking plate 137 can be moved upward by hand. A support projection (not shown) for lifting up the lower surface of the lever locking plate 137 is preferably formed on the outer surface of the lower filter housing 140 so that the lever locking plate 137 is lifted up by means of the support projection when the upper filter housing 30 is combined with the lower filter housing 40.

Meanwhile, the passage control lever 135 that has been rotated clockwise is stopped at a certain position by means of the lever-rotation preventing projection 142. Therefore, when a passage change is performed properly, the passage control lever 135 is not rotated anymore.

When the passage change is performed as described above, the lower filter housing 140 is prevented from being rotated by the action of the lever-rotation preventing projection 142 and the stop portion 135c of the passage control lever 135. Therefore, water leakage due to the undesirable rotation of the lower filter housing 140 is prevented.

As described in relation to the first and second embodiments, the present invention provides a filter housing assembly for refrigerators that has the following advantages.

First, in the process of replacing an old filter element with a new one, water can be supplied to its lower filter housing only after a passage change is performed by the rotation of its passage control lever. Therefore, water leakage, which occurs when water is supplied to the lower filter housing prior to the complete combination of its upper and lower filter housings, can be prevented.

Secondly, since a water passage is formed between the inlet and the outlet of the upper filter housing while the upper filter housing is separated from the lower filter housing, water can be supplied to the various portions of a refrigerator even while the upper filter housing is separated from the lower filter housing.

Thirdly, since a valve is prevented from being rotated by means of a valve-rotation preventing member or a lever locking plate while the upper filter housing is separated from the lower filter housing, water leakage due to the undesirable rotation of the valve can be prevented.

Fourthly, when a water passage to the lower filter housing is formed by the rotation of the valve, the lower filter housing is prevented from being rotated by means of a filter-rotation preventing member, or a lever-rotation preventing projection and the stop portion of a passage control lever. Therefore, after the water passage to the lower filter housing is formed, water leakage due to the rotation of the lower filter housing can be prevented.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A filter housing assembly for refrigerators, comprising:
   an upper filter housing having an inlet, an outlet, an inflow passage and an outflow passage;
   a lower filter housing being detachably combined with said upper filter housing and holding a filter element for purifying water supplied through the inflow passage of said upper filter housing;
   a valve having a cylindrical body with a first passage hole vertically formed in a central portion of said cylindrical body, and second and third passage holes vertically and oppositely formed on both sides of said cylindrical body so as to selectively connect the inlet to the outlet, and the inlet and the outlet respectively to the first inflow passage and the first outflow passage; and
   a passage control lever fixedly connected at its one end to said valve so as to rotate said valve for the selective connection of said valve.

2. The assembly according to claim 1, wherein said passage control lever is connected at its one end to a plane surface of said valve.

3. The assembly according to claim 2, wherein a stop portion is formed on an end of said passage control lever, and a lever-rotation preventing projection is formed on an outer surface of said lower filter housing for allowing a proper passage change to be performed and preventing said lower filter housing from being rotated by stopping said stop portion.

4. The assembly according to claim 3, further comprising a lever locking plate for preventing said passage control lever from being rotated while said upper filter housing is separated from said lower filter housing, said lever locking plate surrounding said passage control lever.

5. The assembly according to claim 2, further comprising a lever locking plate for preventing said passage control lever from being rotated while said upper filter housing is separated from said lower filter housing, said lever locking plate surrounding said passage control lever.

6. The assembly according to claim 5, wherein a locking neck is formed on said passage control lever by cutting off a certain width of upper and lower portions out of said passage control lever at a predetermined position, and a locking hole having a locking notch is formed through said lever locking plate so that said locking neck is inserted into the locking notch portion of said locking hole in a case where said passage control lever is rotated at a predetermined angle.

7. The assembly according to claim 6, further comprising a support projection for lifting up said lever locking plate when said upper filter housing is combined with said lower filter housing, said support projection being formed on an outer surface of said lower filter housing.

* * * * *